United States Patent [19]

Tolson, Sr. et al.

[11] 3,870,804
[45] Mar. 11, 1975

[54] PREPARATION OF FRIED PARBOILED RICE AND THE RESULTING PRODUCT

[76] Inventors: Ray C. Tolson, Sr., 1720 W. Miramonte Dr., Woodland, Calif. 95695; Ray C. Tolson, Jr., Rt. 1, Box 165, Harold, Calif. 95638

[22] Filed: Apr. 10, 1974

[21] Appl. No.: 459,580

Related U.S. Application Data

[63] Continuation-in-part of Ser. No. 293,077, Sept. 28, 1972, abandoned.

[52] U.S. Cl. ............... 426/141, 426/355, 426/441, 426/438
[51] Int. Cl. ............................................ A23l 1/18
[58] Field of Search ........... 426/199, 355, 441, 438, 426/450, 141, 462

[56] References Cited
UNITED STATES PATENTS

| 2,903,360 | 9/1959 | Seltzer | 426/462 |
| 3,189,462 | 6/1965 | Autrey et al. | 426/462 |
| 3,600,192 | 8/1971 | Tanaka et al. | 426/355 |

*Primary Examiner*—Raymond N. Jones
*Attorney, Agent, or Firm*—Phillips, Moore, Weissenberger, Lempio & Strabala

[57] ABSTRACT

Partially expanded fried rice is produced by parboiling rough, unhulled rice kernels, followed by drying the milled rice prior to frying.

4 Claims, No Drawings

PREPARATION OF FRIED PARBOILED RICE AND THE RESULTING PRODUCT

BACKGROUND OF THE DISCLOSURE

This application is a continuation-in-part of our application Ser. No. 293,077 filed Sept. 28, 1972, for "Ready-to-Eat Rice Product", now abandoned.

Rice has been a staple of diet since ancient times, especially in Asiatic countries such as China and Japan. However, because of the complicated and time-consuming preparation required to render raw rice palatable, this grain has never become similarly accepted as a food in the West, particularly in the United States where foods which are either ready-to-eat or convenient and quick to prepare are in demand.

One ancient method of preparing rice in Asiatic countries and elsewhere has been that of parboiling, which substantially increases the nutritional value of the grain over that of regular raw milled rice, renders it less subject to breakage during subsequent processing (for example, drying or milling) thereby decreasing product loss, and further, improves the keeping qualities of the rice grains.

Parboiling is accomplished by soaking rough, unhulled rice in water which is generally at least tepid, for a sufficient period of time to saturate the rice grains with moisture; and then partially cooking the saturated rice until the kernel of the rice grain is gelantinized; the cooking is most usually accomplished by immersion of the staturated rice in boiling water, or by steaming, frequently under pressure. The time required to thus partiallly cook the saturated rice will of course vary according to the temperature of the cooking medium and the type of rice; however, a cooking period of from about 15 minutes to about an hour will usually suffice to gelatinize the starch of the kernel. The rough, partially cooked rice is then dried back to the original moisture content of the rice as it was harvested, about 12% to about 15%.

By this process, the outer and inner bran layers of the rice grain, which have a high vitamin and mineral content are fused into the kernel, thereby avoiding loss of these nutritional elements during the subsequent milling process; the rice grain thereby acquires an off-white or brown color. After drying, the rice is milled by conventional methods such as the use of rubber shellers and stones whereby the rough hull and outer bran layer of the rice grains is removed and the kernels are smoothed.

Although this method of treating rough rice produces a superior rice product, especially in terms of nutritional value, flavor, and storageability characteristics, as discussed above, the rice end product of parboiling is even more difficult of preparation for eating then is regular raw milled white rice, typically requiring up to about a 25–30% longer cooking period than does regular white rice under the same conditions to render it palatable. On the other hand, however, when cooked, parboiled rice presents a superior product especially with respect to nutritional value and appearance, i.e., the grains separate easily and exhibit but very little of the characteristic sticky-gumminess of cooked white rice.

The stability during the final cooking process has been a disadvantage in the commercial exploitation of parboiled rice, and many attempts have been made to render it edible (preferaby in under about 5 minutes) have characteristically had the disadvantage of either poor end product or complicated method of treatment of the parboiled rice, and frequently both.

Some prior art methods directed toward producing a rice product which is quick-cooking have utilized regular raw milled rice as the starting material for the treatment process. However, much is sacrificed in terms of nutritional value and flavor of the resultant product due to loss of the bran coating during the milling of the raw white rice; further, cautious handling of the intermediate products is required to avoid cracked and broken kernels, and also storageability qualities of the intermediate and end products are much less satisfactory. In addition it is contemplated that the consumer will subject the dehydrated rice end product to further cooking and such end product is characteristically inedible or unpalatable in its marketed state.

One such prior art method is that disclosed in Tanaka U.S. Pat. No. 3,600,192 issued Aug. 17, 1971. Tanaka reveals a method for producing a fried rice product that is suitable for instant cooking (in water) to produce the final edible product. More specifically, Tanaka first boils raw milled white rice to convert the starch therein to $\alpha$-starch. The boiled rice is then dried to a moisture content of about 10–20%. The dried boiled rice is then fried to further reduce the moisture content and increase swelling of the kernels. The drained parboiled fried rice is subsequently boiled in water for a short time to produce the edible product.

In our prior U.S. Pat. No. 3,706,573, we disclosed a quick cooking fried rice product that is produced from raw white rice. In this prior process, raw white rice is quickly "fried" in oil or fat at a relatively high temperature to at least partly convert or gelatinize the starch. The fried product is drained and packaged. It is thereafter boiled in water for a relatively short period of time to produce the boiled edible product.

Both the Tanaka and our prior patent contemplate the preparation of white rice products that are "intermediates" in the sense that they are subjected to further boiling in water prior to table service. In other words, they are further processed immediately prior to use.

BRIEF SUMMARY OF THE INVENTION

It has been found that by the process of the instant invention parboiled rice may be unexpectedly simply and conveniently treated with a minimum of steps including a short deep-frying period at moderate temperatures to yield a partially-expanded dry rice product which requires no further cooking on the part of the consumer to be highly palatable.

The process of the invention is an improvement over prior art processes by providing, inter alia, a method of cheaply and efficiently producing an improved partially-expanded dry rice product which is very storageable, nutritious, flavorful, and of an appealing crunchy texture, eminently suitable for use as a snack product, appetizer or other light refreshment, or for use in recipes which call for expanded dry grain products or similar ingredients.

Accordingly, it is an object of this invention to provide a new and improved process for the treatment of parboiled rice which results in a new partially-expanded dry rice product having superior qualitites of flavor, texture, and nutritional value, and is thereby an appealing comestible for snacks, appetizers, and the like.

It is a further object of this invention to provide a new and improved process for the treatment of parboiled rice which results in an improved dry rice comestible which may advantageously be included in standard recipes where appropriate.

It is a further object of this invention to provide a new an improved process for the treatment of parboiled rice which is unexpectedly quick and simple yet yields an end product of high storageability, flavor and nutritional characteristics.

It is an additional object of this invention to provide a new and improved process for the treatment of parboiled rice which exposes the parboiled rice to comparatively moderately elevated temperatures for only brief periods of time, thereby preserving its flavor and nutritional values and at the same time providing a partially expanded dry rice product of appealing texture and taste.

Other additional objects and advantages of the invention will be apparent from the herein-contained description to those skilled in the art, or may be learned by the practice of the invention.

DETAILED DESCRIPTION

In accordance with this invention whereby the above noted objects are accomplished, rice is parboiled according to processes known in the art, dried by suitable methods to a moisture content of about 12% to about 15% (approximately the moisture content of the rice as harvested), milled to remove the rough hull and smooth the kernels of the rice grains, and briefly deep-fried for from about 5 to 20 seconds at from about 350°F. to about 410°F. in a suitable frying medium; the excess oil is then removed. It is contemplated that seasonings such as salt or spices or other condiments may be added during the treatment process, usually advantageously after draining the excess oil, although this would necessarily depend on the specific flavorings selected to enhance or vary the flavor of the resultant dry rice product. Of course, the rice may be prepared with preservatives or other appropriated additives, if desired.

In a preferred embodiment of this invention, rough (unhulled) rice having a moisture content of less than about 15% is parboiled by customary methods to gelatinize the kernel, and to fuse the outer and inner bran layers into the kernel; the rice is then dried to a moisture content of from about 12% to about 15%. The dried parboiled rice is then milled by a conventional method, for example by stones or rubber shellers, to remove the hull and remaining bran layer and to smooth the kernels of the rice grain.

The hulled rice is then fed into an oil bath wherein the temperature of the oil is maintained at about 350°F. to about 410°F., and preferably at about 385°F. Any edible oil or melted fat having a suitably high smoking point may be utilized in the oil bath; peanut, safflower, and corn oils are examples of appropriate oils. The hulled rice is fried in the oil bath for a period of from about 5 to 20 seconds, preferably from about 7 to about 14 seconds, and is then removed, drained of excess oil, and cooled. Salt or other seasonings may advantageously be added to the cooled dry rice product. The dry product has a creamy light tan color, with each grain being greatly expanded (roughtly 5 times) in volume from the raw rice feed material. The grains are also rather rough in appearance as compared to the smooth parboiled rice grains. Unlike the parboiled rice feed material that has a shiny translucent appearance, the product of the invention is opaque and dull on the surface.

The ready-to-eat product has a total moisture content of perhaps 2 to 3%, while the total fat ranges above 23%, most usually from about 24% to over 26%. In some instances the oil content may range as high as 30% of the weight of the rice product.

The dry product has an extremely pleasant flavor somewhat reminiscent of a rather nutty "pop-corn". The dry product is quite crunchy and crisp when chewed, but also present a satisfying "fullness" in chewing volume.

The dry product is fully edible as such, but the addition of salt or other spices may sometimes be desired. The dry product is also quite useful as a nutritious and flavorful "filler" in many recipes, particularly in various candy compositions such as chocolate bars, corn syrup balls and the like. The product can also be eaten as a dry breakfast cereal with the addition of sugar, milk or cream, as desired.

An example of suitable apparatus for accomplishing the introduction of the rice into the oil bath and its removal therefrom is described in detail in U.S. Pat. No. 3,706,573 (Ser. No. 49,507) to Tolson, et al. The temperature of the oil bath is quite critical, since too high a temperature will result in the explosive emission of moisture from the rice, causing the kernels to crack and shatter; further too high an oil temperature tends to darken the rice and change the flavor. On the other hand, too low an oil temperature results in incomplete frying of the rice kernels or necessitates an excessively long cooking time with concomitant decrease in the production rate.

The following specific example is provided only as an illustration of the method of the invention and is not to be considered as limiting the scope or the principles thereof.

EXAMPLE

Rough, unhulled rice of an overage moisture content of about 14% was soaked in water until saturated. The saturated rice was then partially cooked by steaming at atmospheric pressure for a sufficient period of time to gelatinize the kernels of the rice grain and fuse the outer and inner layers of bran into the kernel. The rice was then dried with hot air to a moisture content of about 14%. The dried parboiled rice was then milled sufficiently to remove the rough hulls and bran layer and to smooth the kernels of the rice grain.

1000 grams of this hulled parboiled rice was then introduced into a peanut oil bath wherein the temperature of the oil was maintained at about 385°F., and deep-fried in this oil for a period of about 8 seconds. The deep-fried rice product was then removed, drained of excess oil, and cooled.

It was found that 275 grams of oil were used in the deep-frying process. A portion of this oil represents a replacement of the moisture content of the rice that is lost at the high frying temperature, while the remainder of the oil is absorbed by the rice and presents an increase in the weight of the product over the original weight of the dried parboiled rice. The dry rice product was found to have a specific gravity of about 0.20 relative to raw rice grains.

What is claimed is:

1. A method for producing a partially expanded edible rice product comprising the steps of:
    parboiling rough unhulled rice kernels;
    drying said rice kernels back to about their original, as harvested, moisture content;
    milling the dried parboiled rice kernels to remove the rough outer hull and outer bran layer, and to smooth the kernels;
    frying the milled kernels in an edible oil at a temperature of from about 350° to about 410°F. for from about 5 to about 20 seconds to produce a partially expanded product;
    separating the fried kernels from the oil and removing excess oil from the surface of the kernels; and
    cooling the fried kernels.

2. The method of claim 1 wherein the parboiled rice kernels are dried to a moisture content of from about 12% to about 15%.

3. The method of claim 1 wherein salt and seasoning are added to the fried kernels.

4. The partially expanded rice product produced by the method of claim 1.

* * * * *